United States Patent [19]

Brill et al.

[11] 4,040,066

[45] Aug. 2, 1977

[54] AUTOMATIC BASE LINE CORRECTION FOR P/T (PHOTOCOMPOSING MACHINE)

[75] Inventors: Henry L. Brill, Flushing, N.Y.; Jacob H. Moody, Scotch Plains, N.J.

[73] Assignee: Addressograph-Multigraph Corporation, Cleveland, Ohio

[21] Appl. No.: 598,786

[22] Filed: July 24, 1975

[51] Int. Cl.[2] .......... G03B 15/00

[52] U.S. Cl. .......... 354/10; 354/7

[58] Field of Search .......... 354/6, 7, 8, 9, 10, 354/11, 15

[56] References Cited

U.S. PATENT DOCUMENTS

| | | | |
|---|---|---|---|
| 3,017,811 | 1/1962 | O'Brien | 354/9 |
| 3,422,736 | 1/1969 | Moyroud et al. | 354/7 |
| 3,631,775 | 1/1972 | Lidd | 354/10 |
| 3,638,541 | 2/1972 | Lew et al. | 354/7 |
| 3,693,516 | 9/1972 | Aron et al. | 354/15 X |

*Primary Examiner*—Edna M. O'Connor
*Attorney, Agent, or Firm*—Ray S. Pyle

[57] ABSTRACT

A method of using photocomposition technology to insure all characters falling on a common text base line when multiple lenses are used to change point size in a line of text. Each lens is tested by deliberately setting the flash circuit to be armed by its dedicated timing mark to flash before the character is properly aligned with the optical system. Then from a memory record produced by a previous test program, the flash is delayed by the count in memory. Therefore, the mechanical positioning of a plurality of lenses in a turret may be only reasonably accurate, and not be responsible for misplacing characters off of the text base line when lenses are intermixed during composition of that base line of text.

2 Claims, 13 Drawing Figures

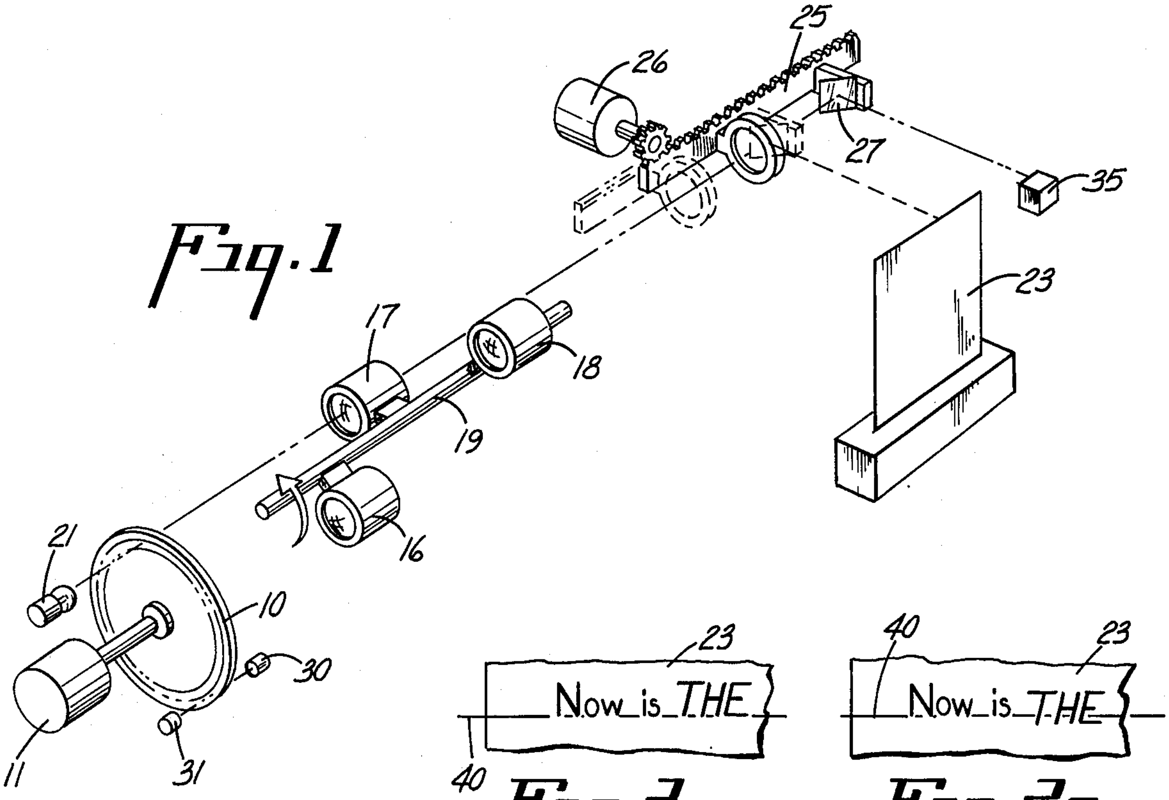
Fig. 1
Fig. 2
Fig. 2a
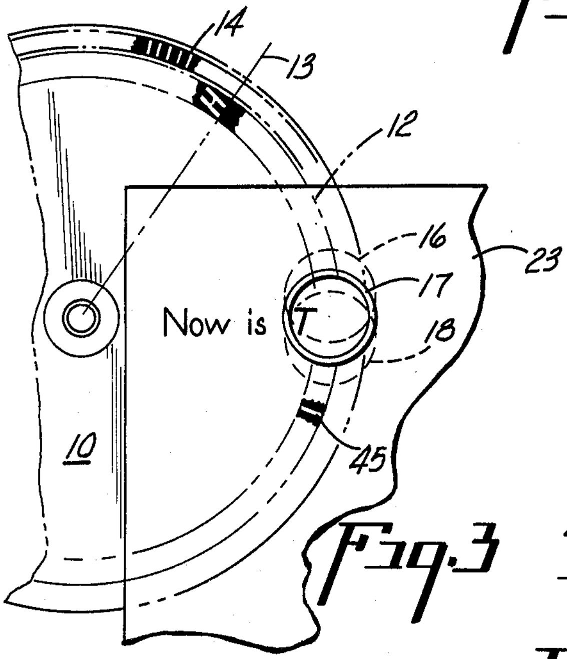
Fig. 3
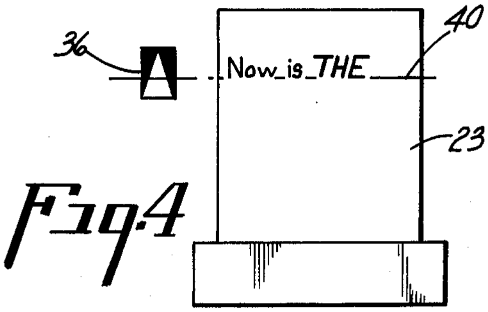
Fig. 4
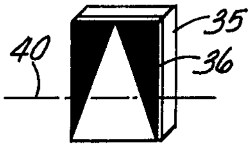
Fig. 5
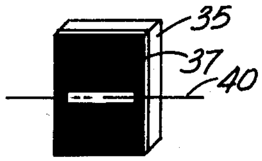
Fig. 6
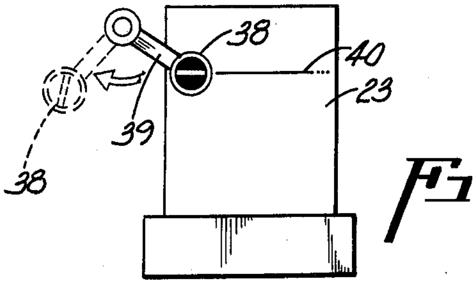
Fig. 7

AUTOMATIC BASE LINE CORRECTION FOR P/T (PHOTOCOMPOSING MACHINE)

BACKGROUND OF THE INVENTION

Whenever a lens is positioned in the optical system of a photocomposer machine, the physical mounting of the lens will establish the actual placement of the optical axis of that lens according to manufacturing tolerances which have been allowed in manufacturing the mount. Therefore, although engineering calculations can be made to place the font of characters, the lens and escapement, and the sensitive film holder all in proper relationship, the allowable tolerances may establish the optical axis somewhat differently than the calculation forecast. In a single lens machine, this deviation from forecast is not critical because everything in the composition will then take place from the composition base line as it actually is established.

Garth, U.S. Pat. No. 2,888,865, teaches the use of changeable lens systems for placing enlarged and/or reduced images in specific leading relationship for producing subscript and superscript members in relationship to a base line, the most common uses being mathematical formula and footnote indicia.

This prior patent uses detents to select a lens of proper magnification and base line relationship. The offset from the base line is deliberate, and the exactness is not critical.

However, when it is desired to change the lenses for the purpose of changing point size and maintaining the composition on the base line, particularly if the change is to occur within the line, the machine tolerances for a new lens positioned in the optical system will usually cause the base line to fall on a different line than the base line of the first lens. Hence, the alignment of a multiple lens machine, for example, that type which has a rotating turret of lenses, requires painstaking, skilled labor to adjust all lenses to a single base line. If time should cause any distortion of the mounting, the painstaking effort must be redone to reestablish the continuity of base line.

SUMMARY OF THE INVENTION

Although this invention could be used with a single lens machine, it will find the most applications in a machine wherein lenses are changed for point size change. Therefore, it is the purpose of this invention to establish a series of lenses in a lens changing machine with reasonable accuracy and to compensate for changes in the optical plane of the various lenses by optically testing a lens each time it is placed in position and then timing the exposure flash of the photocomposer system to cause the flash to occur at a time when the character is aligned to a chosen arbitrary base line regardless of where, within reasonable limits, the projected character would fall if a fixed time flash were employed.

IN THE DRAWINGS

FIG. 1 is a schematic of a photocomposing machine embodying the features of the invention;

FIG. 2 is a portion of a line of composition with point size change, properly aligned on a base line;

FIG. 2a illustrates the result of improper lens alignment in making a point size change;

FIG. 3 is a schematic overlay of font, lens, and objective plane showing possible lens misalignment;

FIG. 4 illustrates a photosensitive sheet together with a photocell aligned in the sheet plane;

FIG. 5 is an enlarged perspective of a photocell having one type maks;

FIG. 6 is a mask for an alternative system;

FIG. 7 is an alternative means for placement of a photocell;

DESCRIPTION OF THE PREFERRED EMBODIMENT

Figure 8:
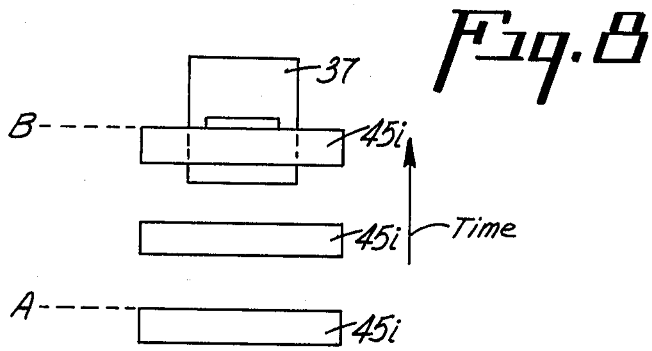
FIGS. 8 - 12 are logic diagrams explaining the operation and result of the system.

Photocomposition, as that word is most broadly interpreted, is now a very mature art. Fundamentally, photocomposition is an adaptation of the photographer's art, and although it embraces a concept of contact printing of photographs, is more closely related to projection printing by means of enlargers.

The sophistication of equipment, of course, is far removed from photographic concepts. Rather than a single negative from which an image is projected, photocomposition is now normally considered to employ a moving character font bearing a series of characters. Stationary matrices have been used; however, it appears that current development is leaning heavily toward the use of a disc font with the characters arranged in circular paths around a center of rotation. However, drums and film strips are embraced within the photocomposition systems which this invention will serve. The criteria which will determine those systems which may be served is that the characters which are photographed one after the other in a series, must approach the projection position with the base line of the character approaching the desired base line position. To clarify that statement, the earlier photocomposition systems placed characters on a disc with the base of the character directed toward the center of rotation of the disc. Hence, any mistiming of the exposure flash resulted in a letter spacing error, and perhaps some letter tilting, but no base line problems. Although earlier examples may be found, one of the most clear teachings of the placement of the characters with the base line of the character on a radius of the disc is U.S. Pat. No. 3,590,705 issued July 6, 1971. This places the projection position at the 90° position and the timing of the flash will dictate the location of the base line of the letter relative to the base line of the composition on the photosensitive sheet. Early flash will cause an elevation of the character and late flash will cause a subscript position of the character.

In FIG. 1 of the drawings a rotating disc character font 10 substantially of the type shown in U.S. Pat. Nos. 2,486,406 and 3,590,705 is shown as the transparency source of characters and related control data. A motor 11 is the driving means used to rotate the disc at a substantially constant speed.

In FIG. 3 a character track 12 is shown with an illustration of the characters therein each located on a base line which is a radius 13 from a common center of rotation of disc 10.

The FIG. 3 also illustrates that the font has a timing track 14 by which the rotary position of the font is traced. These are known prior art features which may be seen in U.S. Pat. No. 3,590,705. The font 10, more broadly described as a character carrier, bears its characters to be photographed and the corresponding timing track markings, in precise spatial relation to one another. Usually, and in the illustrated embodiment, each member of the track 14 is a dedicated impulse generating means for one character, with the exception of one extra mark of differing size or characteristic which enables the photocomposition system to recognize that mark as a starting place. The starting place causes a counting register to empty and restart a count each time the starting mark appears.

To illustrate the concept of this invention, three focusing lenses 16, 17 and 18 are shown mounted on a rotary shaft 19. No drive means for the shaft 19 has been illustrated. Normally positioning of the shaft is done by a program controlled stepper motor, although manual shifting or motor drive controlled by other means is entirely feasible. Each lens has a focal length which dictates a particular point size magnification from the same character in the track 12. Hence, to change size during composition, the projection is halted for a time sufficient to allow an alternate lens to be rotated into the optical path of the system.

A conventional intermittent flash device, or illuminator, is shown as a flash bulb 21.

In the FIG. 3, a photosensitive sheet 23 is shown overlain by a phantom illustration of disc 10 and the three lenses. Lens 17 is shown in full line, because it is in the focal path in FIG. 1. Lenses 18 and 19 are shown in dotted outline, in a possible operating position they could assume when selected, and as shown seriously offset from the position of lens 17 for emphasis. Normally the mechanical detent and positioning devices holding the three lenses will not produce a misalignment as serious as that illustrated in FIG. 3, therefore, FIG. 3 may be considered an exaggerated showing for teaching purposes.

FIG. 3 is the essence of a photocomposition system, regardless of the apparatus surrounding the system to make it practical. The font 10 as the character source, the lens 17, 18 or 19, as the means to focus a flash illumination of the font, and a photosensitive sheet 23 upon which the composition is projected. Relative lateral movement of paper or disc, whether physical movement or optical leverage by moving of a lens, causes the selected and projected characters to be spaced one after the other in a series to produce a line of composition. A portion of a line of composition is illustrated in FIG. 3 partially finishing the phrase shown in FIGS. 2 and *2a*. In FIG. 2 it is assumed that either the lenses producing the first two words, and the larger point size third word, are in perfect alignment, or have profited by the correction of this invention. In FIG. 2a, the consequence of misalignment between lenses when point size occurs is illustrated.

In FIG. 1, therefore, the practical means for producing a line of composition is set forth as a carriage 25, which is moved along the optical path of the lens 17 by means of a stepper motor 26. The optical path is turned at right angles by means of a mirror 27. Thus, by controlling the escapement of the carriage 25 by means of the motor 26, a line of composition may be stepped along the path to compose as shown in the FIGS. 2 and 3.

Although it is assumed that this invention is directed mainly to a situation in which lenses are changed, it is conceivable that a machine may be built by simply assembling a lens into a holder and then correcting any error by means of this invention.

A photocell 30 is shown positioned in front of disc- 10 and a light source 31 on the opposite side, in order to cause the generating means, which is the series of markings in timing track 14, to produce a counting from the starting mark in order to locate a character to which a timing mark is dedicated in the projection area. This timing mark concept is commonly known, but one example, specifically incorporated by reference, is U.S. Pat. No. 2,775,172 which teaches the construction and operation of sensing devices and programs to locate specific characters on a disc.

Although another special marker could be employed, together with yet another sensor and light source, it is more efficient to employ the leader character, which has been given the reference 45 in the drawing, as such special selected character.

Then, a sensor 35 is placed in the plane of the photosensitive sheet 23 in order to test the position of the special character 45 through a selected lens in relationship to a desired base line 40 for line of composition. The testing may be done by digital or analogical means, which will be well understood by those familiar with photocomposition and electronic arts.

First, a system will be explained which is useful primarily only for a single lens. The digital system is illustrated in the FIGS. 4 and 5. Sensor 35 is shown with a "V"-shaped mask. The sensor 35 is a photocell which will produce a voltage output in accordance with the amount of light which reaches it surface. The entire surface under the mask 35 is photoreactive, but the mask will cause a reduction of the amount of energy output according to the vertical location of a shaft of light falling across its surface. Therefore, if the light that is projected through the leader 45 should fall exactly on line 40, a voltage output from the sensor 35 characteristic of that position will be sensed by a programmed gating device in the control circuit and indicate that the lens is so positioned that flashing can take place in a precise known position. If the light falls either to the smaller or larger portion of the mask, the voltage output will be altered and the change in voltage output can be programmed through the circuit to select from a memory the exact distance that the image of the marker 45 has deviated from the desired position.

Then, the method of this improved position control specifies that the circuit and program shall count the number of marks which selects the desired character and arm the circuit controlling the flash illuminator 21 at a time prior to the arrival of the character at the proper position within the projection area. Thereafter, the gating device which includes the program circuit will measure the distance from the desired base line position at which the first image of the special character 45 fails, and will alter activation of the gating device which has armed the flash illuminator 21 to cause the flash to occur at a position relative to said projection area which will cause projection of a printing character thereafter to be located on the proper base line of composition. This alteration may be a subtraction or addition to the normal flash delay period, but preferably the arming of the flash device will take place at a substantial period of time prior to the projection area in order to allow the gating device to delay flash from the time of arming for a given period of time until flash occurs.

The preferred structure and method as shown in the FIG. 6 is used for obviating the alignment problem when using a lens change system for point size change. The mask 37 is a slit mask. Then, the program causes illumination of the special character 45 in rapid series from a starting time long prior to the projection area and will delay the subsequent projection each revolution of the disc and record that period of delay until finally exact registration of the image of character 45 is coincident with the slit in the mask 37. Then, the memory will retain a count indicating the distance from the arming of the flash device 21 until flash is desired.

Location of the sensors 35 as illustrated in FIG. 4, at a position beside the sensitive paper is made possible by the stepping of the mirror 27 beyond the normal composition period until such measurement is made and the memory of the control system provided with the proper count for use thereafter in actual composition. Normally, this memory will be stored for the full period of time that a particular lens remains in the optical path, but it is conceivable that such measurement could be made before each exposure of a character.

Some photocomposition machines do not have the capability of stepping the projection beyond the composition paper, and in such event, a sensor 38 on a pivot arm 39 will allow the sensor to be placed in front of the sensitive paper until such measurements are made, whereafter it is pivoted out of the composition path so as not to interfere with the normal composition thereafter.

A third alternative is to place the sensor in the position of the paper 23 and test each lens before paper is installed. That information then becomes a PROM until a new disc is installed.

The construction of the invention has been adequately shown, and therefore the following will be directed to the operation and the result more than physical construction.

FIG. 8 depicts the situation as an image of the leader line is first projected a distance from the alignment with the slit in the mask 37 of the sensor 35. By means of a long peak flash, or repeated short high peak flash, the progress of the image of leader 45 will be toward the slit in the mask 37. This situation is depicted by the three blocks labelled **45*i*, indicating the image of leader character 45. In this illustration of FIG. 8, the first flash is assumed to occur with the forward edge of the image located along line A. The front edge of the image progresses until it is coincident with line B which is the first sensing edge of the slit in mask 37. At that instant in time, the sensor 35** will first begin to produce an output signal indicating arrival of the image in coincidence with the edge of the slit.

It does not matter what the point size of image **45*i* may be, because any incidence at line B will cause an output from sensor 35.**

Figure 9:
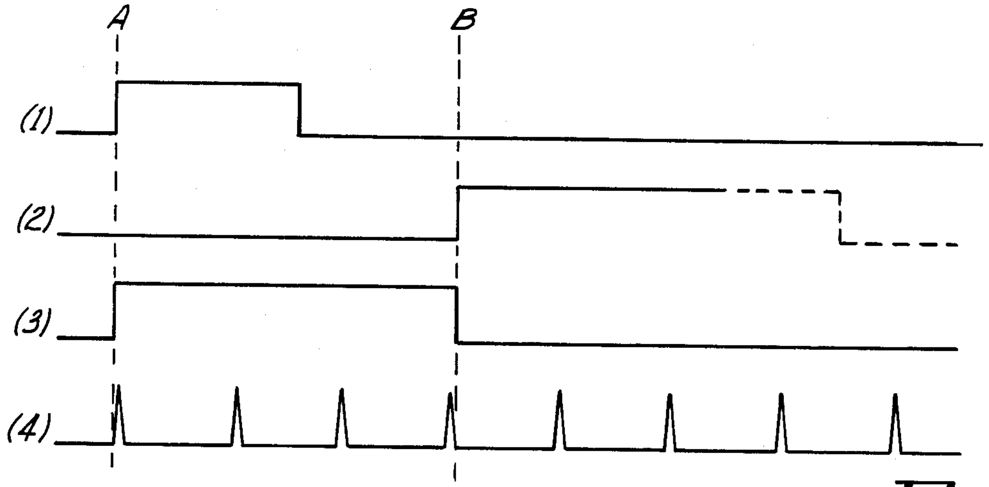

FIG. 9 is a time line diagram showing the events which take place for each lens that is used with disc 10. The vertical line A is that time when the sensor 30 first detects the arrival of the timing track member 14 which is assigned to the leader line 45. At this time, the sensor 30 has previously sensed the beginning character in the timing track, which is usually an enlarged size mark, and the controller has counted the timing track marks to the mark assigned to the leader line 45. It is this time that is depicted by the vertical line A in FIG. 9. In the horizontal line (1) it is seen that the output from the sensor 30 is low, and goes high at the line A when the mark 14 coincides with the sensor 30.

This invention differs from standard practice in that detection of the timing track mark for a particular character is deliberately set to take place prior to the desired time for flash, whereas it is the normal practice to register the timing mark sensor such that when detected a flash will ocurr. Detection of an output at the line A from the sensor 30 does not produce a flash for the leader character. In fact, the exercise being described is not intended to produce a character on the sensitive surface at this particular point in the operation of the invention.

At the time that sensor 30 produces an output at the line A, the output from sensor 35 is low as indicated in horizontal line (2) and stays low until the point B, which coincides with the line B of FIG. 8. The time of duration at high is also not important.

In horizontal line (3) a clock gate is indicated as being enabled in line A and disabled at line B. While the clock gate is open, line (4) illustrates the input of clock pulses through the gate for counting purposes. These clock pulses then indicate the time interval for the particular lens involved from the time that sensor 30 first detects coincidence of the timing mark 14 and the arrival of the image of the leader character in coincidence with the slit in mask 37. Thereafter, with this knowledge stored in the controller, when the controller selects a character, and the sensor 30 begins a count from the starting timing mark, the proper count will take place to indicate the arrival of a timing track mark in coincidence with the detector 30, and at that time the controller will begin counting the number of counts given in line (4) before initiating an exposure flash from the light source 21.

The physical location of any particular lens will materially effect the distance that the image **45*i* of leader 45 must travel from position A to position B in FIG. 8.** A very minor amount of deviation in lens position due to manufacturing tolerances, misalignment during use, or even foreign matter building up on a mechanical stop, can misposition the resultant image projection from a lens. If there were to be no change in lenses during the setting of an entire piece of copy, there would be no harm done. However, when it is desired to change point size in the midst of a line, such misadjustment of the lens is critical. According to this invention, the position of the lens is not critical, and this invention will use the lens wherever it may sit, and will cause the projection from the rotating disc to take place where the resultant image will be properly aligned.

Figure 10:
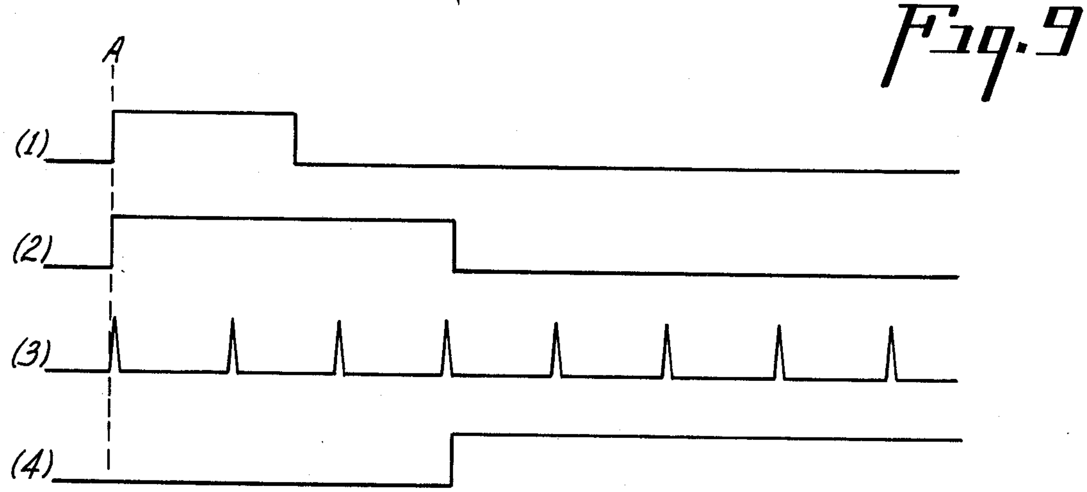

The above-described use of the delay in the flash sequence is shown best in FIG. 10. The line A again depicts the arrival of a timing mark 14 for a particularly selected character in coincidence with the sensor 30. At that moment, a clock gate is opened to allow clock pulses to pass to the controller. The bottom line of FIG. 10 indicates the flash firing pulse remaining low until the end of the countdown at which time the flash circuit is enabled. The countdown is that count which was provided to the controller by the described clock count in line (4) of FIG. 9.

Figure 11:
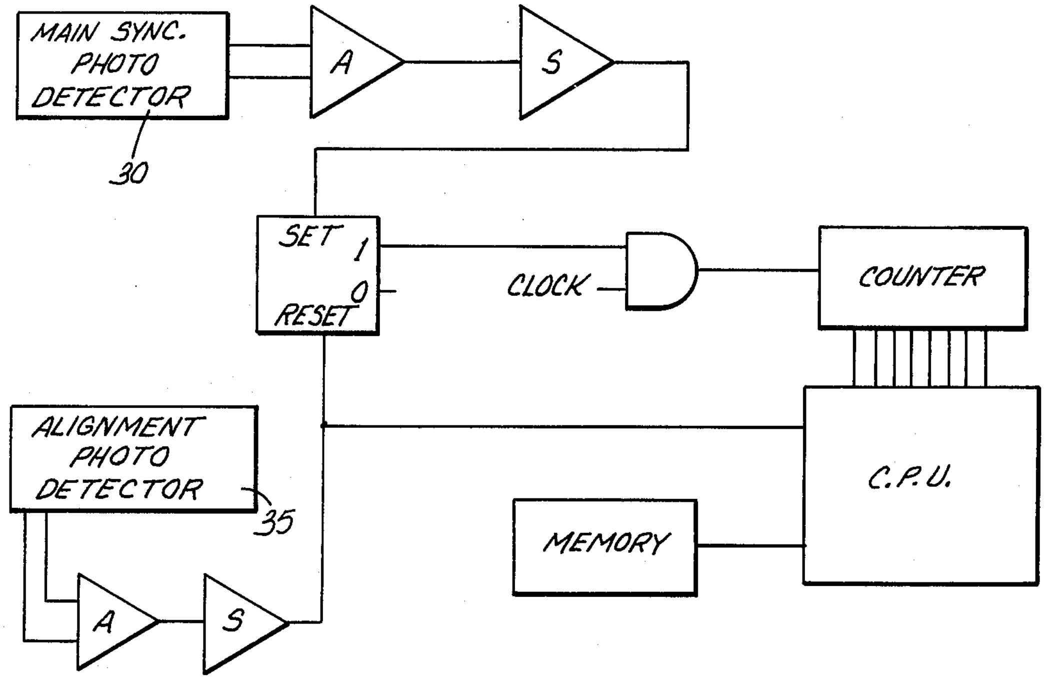

FIG. 11 is a schematic of the circuitry for establishing the count of FIG. 9. This circuit illustrates the detection of the timing mark for the leader and the setting of a flip-flop which inputs to an AND gate and therefore the clock is the controlling input to the AND gate and produces output pulses to a counter.

Upon arrival of the image **45*i* to the alignment photo detector 35**, the flip-flop is reset and the AND gate ceases to pass the clock signals to the counter.

Also, at the arrival of image **45*i* at position A in FIG. 8**, the central processor CPU is enabled to receive the input from the counter and to output that count to memory.

Figure 12:
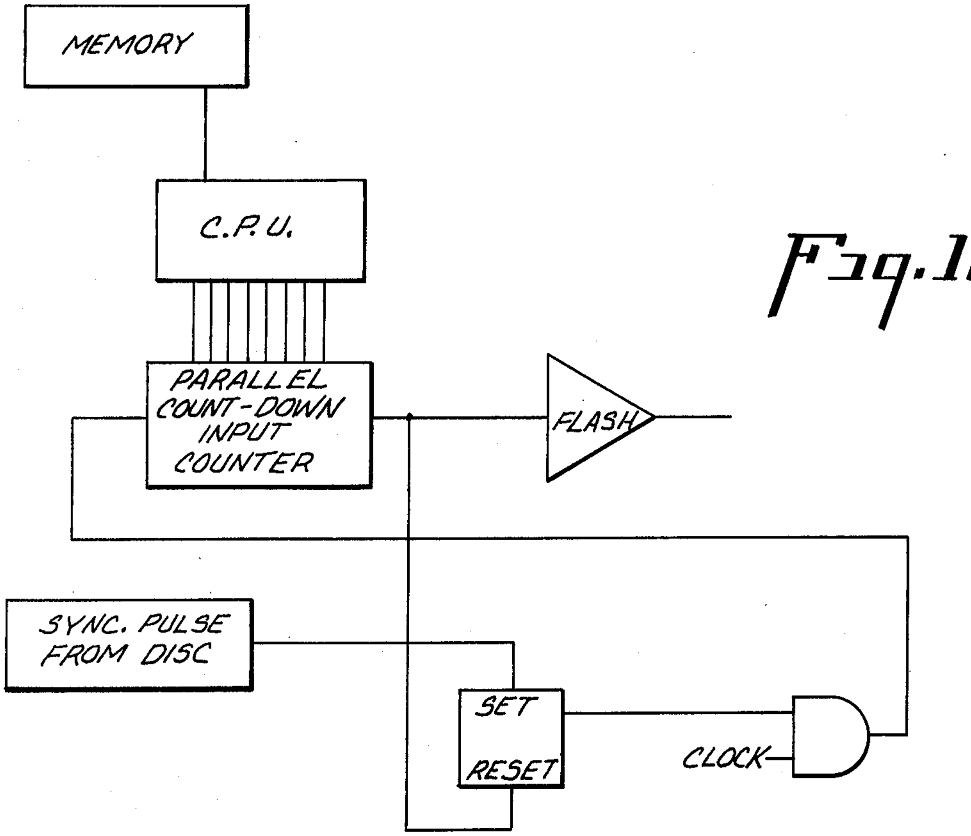

In use, the FIG. 12 shows the memory supplying to the CPU the count required for any particular selected lens, and the count for that lens put into a parallel input preset counter which is supplied by clock pulses whenever a synchronizing pulse from sensor 30 indicates the arrival of a timing mark for a selected character. The flip-flop is set to supply a high to the AND gate and therefore the output from the AND gate is the clock pulse which causes the parallel input preset counter to count down and when the countdown produces underflow or zero detect, the flash will take place to record the character on the sensitized film.

What is claimed is:

1. The method of coordinating a rotating disc bearing projectionable characters, and a changeable set of point size selection lenses, to produce projected copy on one predetermined base line position, comprising essentially these steps:

1. providing a character font on said disc with a timing mark track means wherein each character has a dedicated track mark located in angular relationship to said character for detecting the arrival of said character at a specified rotary position by placing a mark sensing device adjacent the face of the disc along an arcuate path an angular amount removed from the lens substantially equivalent to the angular relationship of the mark to its character;
2. placing a changeable lens in an optical projection position;
3. placing a timing track sensor in said arcuate path at a position, which would cause a flash signal before the character related to the mark has arrived at the optical projection of the lenses;
4. sensing the timing mark for one character and projecting that character prior to its arrival at the optical projection position and continuing the projection as the disc moves the character until the image thereof arrives in proper base line position, and counting units of time from the first projection of the mark until the mark arrives at the proper position;
5. recording that count in memory, and repeating the procedure (1) - (5) for each lens; and 6. in composition, thereafter, counting marks on the track until the mark for an indicated character is located, pulsing a single indicating arrival of the dedicated mark, counting the units of time until the mark arrives at the proper position for the particular lens in use, and then firing a flash circuit.

2. A standard photocomposing machine having a rotatable font disc, a series of characters and a series of dedicated timing marks, a set of changeable lenses for selecting point size projection, a means to detect and count the marks, a flashable light source for projecting a selected character through a selected lens, and associated memory means with processing means to operate the photocomposing machine by a program, the improvement in control of the time of the flashable light source to coordinate the actuation of the flashable light source to coincide with arrival to a relative position of the selected character and the lens wherein the illuminated character will be projected to a desired base line, comprising:

said means to detect the marks placed in a position to read the marks and produce a signal when the character to which the mark is dedicated arrives at a position prior to the said relative position desired for projection;

a predetermined count in said memory means of the time units required for the font disc to move the selected character from said position prior to the desired relative position to the actual desired relative position; and means for delaying said actuation of the flashable light source after a signal is produced for a time equivalent to the time units in said memory means.

* * * * *